July 27, 1954
J. M. ROBERTS
2,684,828
MIXTURE CONTROL VALVE FOR REGULATING PROPORTIONS
AND TOTAL FLOW OF TWO OR MORE FLUIDS
Filed Dec. 15, 1947
2 Sheets-Sheet 1
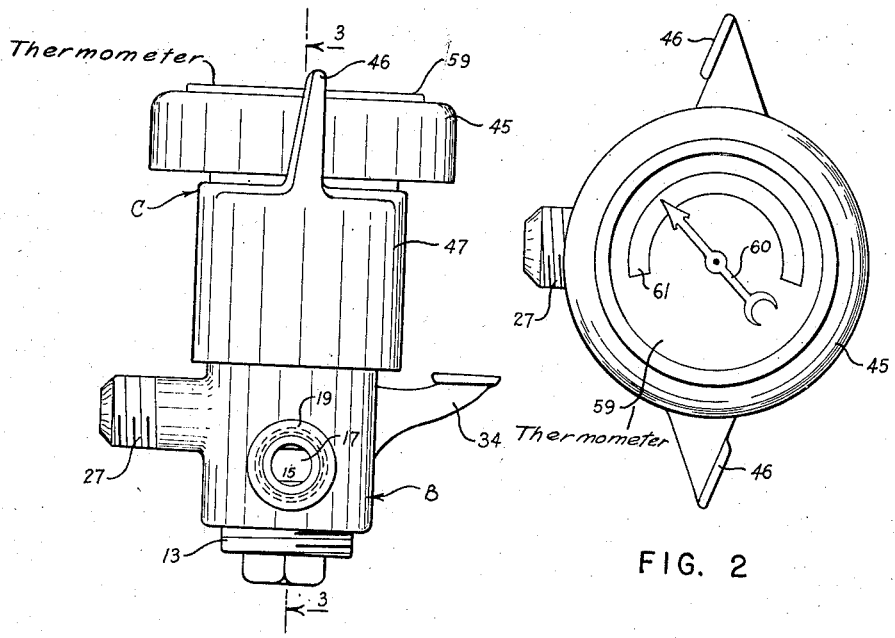
FIG. 1
FIG. 2
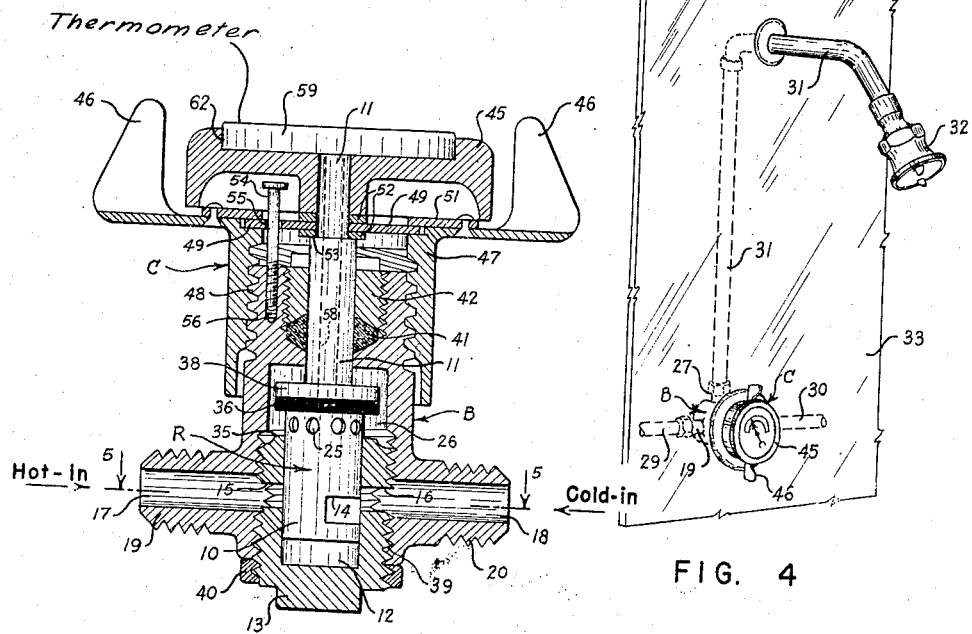
FIG. 3
FIG. 4
INVENTOR.
John M. Roberts
BY
Lampher & Van Valkenburgh
ATTORNEYS

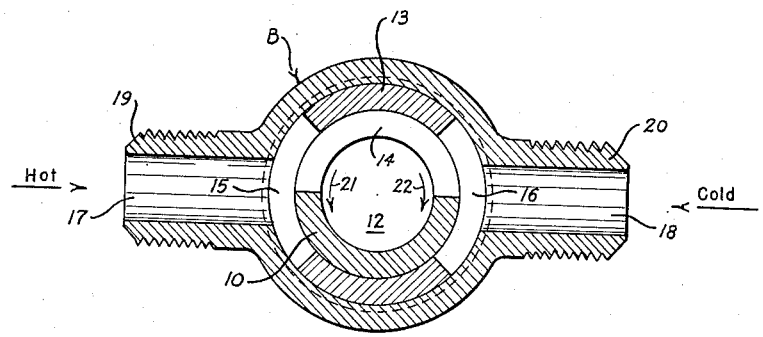
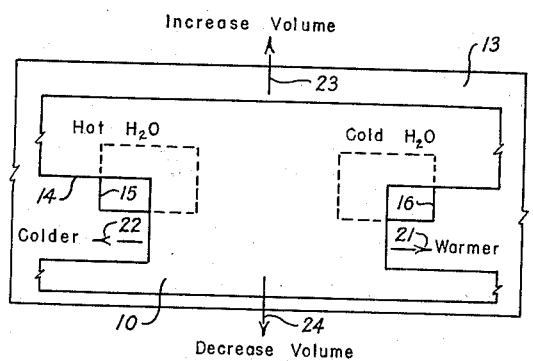
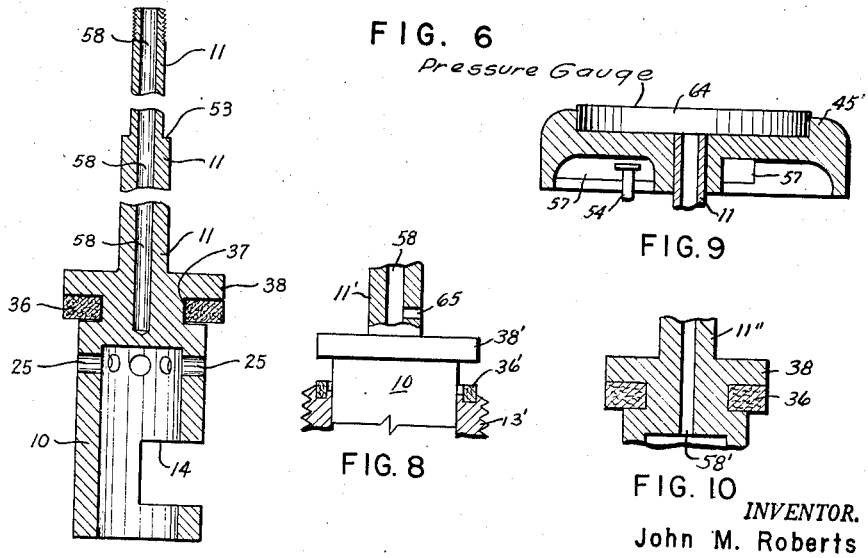

Patented July 27, 1954

2,684,828

UNITED STATES PATENT OFFICE 2,684,828

MIXTURE CONTROL VALVE FOR REGULATING PROPORTIONS AND TOTAL FLOW OF TWO OR MORE FLUIDS

John M. Roberts, Richland, Wash.

Application December 15, 1947, Serial No. 791,923

3 Claims. (Cl. 251—215)

This invention relates to mixture control valves, and particularly to a mixture control valve adapted to regulate not only the proportions of two or more fluids having different characteristics, such as hot and cold water, but also the total flow of the mixture.

The valve of this invention is particularly adapted to be utilized in controlling hot and cold water passing to a shower head or utilized for a similar purpose in home, office or factory, although it will be understood that the valve may be used in controlling the flow of any two or more fluids having different characteristics. By "different characteristics" is meant a difference in physical characteristics as well as in chemical characteristics. Thus, one example is a difference in temperature, such as the difference between hot and cold water, or other fluids. Other examples are differences in specific gravity, viscosity and other normally physical characteristics, or differences in chemical composition or chemical properties. It will be understood, of course, that the fluids may differ in more than one characteristic. Thus, the valve of this invention may be utilized in a plant or factory for mixing two or more fluids, normally liquids, but which may be gaseous.

Among the objects of this invention are to provide a novel mixture control valve; to provide a mixture control valve which includes a single regulator or regulating element for controlling not only the proportions of a plurality of fluids, but also the volume of flow thereof; to provide such a control valve in which the proportions and volume of flow may be adjusted independently, or simultaneously; to provide such a valve which is so constructed that manufacturing and assembly problems are simplified; to provide such a valve which requires only one set of packing for the actuating stem or member; to provide such a valve in which may be installed an indicator, adapted to show a condition of the mixture, such as the temperature thereof; and to provide such a valve which is compact in construction and effective in operation.

The above and other objects and the novel features of this invention will become apparent from the description which follows, taken in connection with the accompanying drawings, in which:

Fig. 1 is a side view of a mixture control valve constructed in accordance with this invention;

Fig. 2 is an end view of the valve of Fig. 1;

Fig. 3 is a longitudinal cross section of the valve, taken along line 3—3 of Fig. 1;

Fig. 4 is a three-dimensional view illustrating the installation of the valve of Fig. 1 in a shower construction;

Fig. 5 is an enlarged cross section of the valve, taken at the plane of the inlets, along line 5—5 of Fig. 3, but with the regulating element at a different position;

Fig. 6 is a diagrammatic development of the cooperating regulating parts of the valve;

Fig. 7 is an enlarged longitudinal section of the regulating element of the valve;

Fig. 8 is a fragmentary vertical section similar to Fig. 3, illustrating a variation in construction thereof;

Fig. 9 is a fragmentary vertical section similar to the upper portion of Fig. 3, illustrating a variation in the construction thereof; and Fig. 10 is a fragmentary section similar to the central portion of Fig. 7, illustrating a variation in the construction.

A mixture control valve constructed in accordance with this invention, as illustrated in Figs. 1 to 3, includes a body B, a regulator R, and control elements C. In general, the body B and the parts thereof are stationary, the regulator R is movable axially as well as being rotatable within the body B, and the control elements C are utilized in adjusting or changing the position of the regulator R.

The primary flow regulation and control of the valve of this invention is effected by a cylindrical sleeve 10 of the regulator R, sleeve 10 depending from the lower end of a stem 11. Sleeve 10 is received in a cylindrical intake chamber 12, as in Figs. 3 and 5, formed in a plug 13 mounted in the valve body B, which plug provides additional features of this invention, as explained later. Sleeve 10 is provided with a transversely extending, rectangular slot 14, which preferably extends for about 180° of the periphery of the sleeve, as in Fig. 5, and is adapted to cooperate with a pair of rectangular ports 15 and 16, disposed opposite each other and formed in plug 13, i. e., provided in the wall of chamber 12. Ports 15 and 16 may each extend for about 90°, as shown in Fig. 5, to provide sensitivity of mixture control—that is, sleeve 10 will turn farther before shutting off the flow at either port. It will be understood, of course, that either or both ports 15 and 16 may have a different angular extent. Ports 15 and 16 are respectively in direct communication with inlet passages 17 and 18, provided in inlet nipples 19 and 20, respectively, to which fluids of different characteristics, such as hot and cold water, may be supplied.

In the position shown in Fig. 5, which corresponds to the position shown in Fig. 6, equal proportions of hot and cold water will flow through the ports 15 and 16, respectively. (Assuming that the water sources are under regulated equal pressure.) When the sleeve 10 is turned in a counterclockwise direction, as in the direction of arrows 21 of Figs. 5 and 6, then the slot 14 will expose a greater amount of port 15 and a lesser amount of port 16, thus making the mixture warmer. Also, when the sleeve 10 is turned or rotated in the direction of the arrows 22 of Figs. 5 and 6, then a greater amount of cold water and a lesser amount of hot water, due to greater exposure of port 16 and lesser exposure of port 15, will produce a colder mixture. When the sleeve is turned through 90° in a counterclockwise direction, i. e., in the direction of the arrows 21, so that cold water port 16 is blanked off and hot water port 15 is fully exposed laterally, then the entire flow will be hot water. Similarly, when the sleeve 10 is turned 90° in the direction of arrows 22, so that cold water port 16 is fully exposed and hot water port 15 is blanked off, then the entire flow will be cold water. The latter, of course, is the position of sleeve 10 shown in Fig. 3. As will be evident, merely by turning sleeve 10, the proportions of hot and cold water, or other fluids having different characteristics, may be regulated.

The total volume of flow may be regulated by moving sleeve 10 axially, or upwardly and downwardly. In the position illustrated in Fig. 6, which corresponds to the longitudinal position of Fig. 3 with respect to total flow, the upper edge of slot 14 is about midway between the lower and upper edges of ports 15 and 16. Thus, approximately half of the total cross sectional area available for flow is uncovered in this position. If the sleeve 10 is moved upwardly, as in the direction of arrow 23 of Fig. 6, then the volume of flow will increase; and similarly, if the sleeve 10 is moved downwardly, as in the direction of the arrow 24 of Fig. 6, the volume of flow will decrease. As will be evident, an increase or decrease in the volume of flow is independent of the relative proportions of the different fluids being mixed. Thus, from Fig. 6 it is evident that the angular position of slot 14 remains the same as sleeve 10 is moved upwardly or downwardly, so that the area of ports 15 and 16 uncovered by slot 14 will remain the same in relative proportion. Thus, the total volume of flow can be adjusted without affecting the regulated proportions of the two fluids being mixed. Furthermore, it is also evident that the total volume of flow does not change during the adjustment of the proportions of the fluids, since the upper edge of slot 14 will remain at the same elevation during angular or turning movement of sleeve 10. Thus, any increase in the area of port 15 uncovered will be compensated by a corresponding decrease in the uncovered area of port 16, and vice versa. (The total volume of flow may, of course, change slightly at the extreme conditions when one of the ports is almost closed, due to the drawing effect of an extremely small port, but such extreme conditions may be generally disregarded for practical operations.)

Referring now to Fig. 3, the cold water, or hot water, or usually a mixture thereof, passes from the interior of sleeve 10 through holes 25 formed about the periphery thereof adjacent the upper end of the sleeve 10, the fluid passing into a discharge chamber 26, formed in body B above plug 13. From discharge chamber 26, the fluid or mixture is discharged through a passage formed in an outlet nipple 27, shown in Figs. 1, 2 and 4. Each of nipples 19, 20 and 27 is provided with pipe threads or other suitable means for connection to piping, hoses and the like. Thus, in the installation shown in Fig. 4, a hot water supply pipe 29 is connected to inlet nipple 19, a cold water supply pipe 30 is connected to inlet nipple 20, and a pipe 31, leading to a shower head 32, is connected to outlet nipple 27. The positions of the inlet and outlet nipples may be varied from those shown, but in the present embodiment, the body B is adapted to extend through the shower wall 33, so that the piping connections may be disposed on the outside of the shower wall 33. The valve may be supported by the piping, or, if desired, the valve body B may be provided with a flanged bracket 34, shown in dotted lines in Fig. 1, for mounting on the shower wall 33.

The regulator R and the plug 13, as well as the body B, may be formed from a casting or forging, as desired, the outer periphery of sleeve 10 being machined to size and the intake chamber 12 being machined or reamed in plug 13. The sleeve 10 is preferably machined with such a tolerance or clearance that it will move relatively freely in the chamber 12, and there is, therefore a possibility that a slight leakage may take place when the valve is shut, due to the continued pressure from inlets 17 and 18. Therefore, a shut-off valve is preferably provided at the upper end of sleeve 10, as by a seat 35 formed at the upper end of plug 13, and a cooperating washer 36, formed of rubber or other suitable material and mounted in an annular groove 37, machined or otherwise suitably formed in regulator R just beneath a supporting flange 38 for the washer, as shown also in Fig. 7. It is evident that when the valve is closed, washer 36 will engage seat 35 effectively to prevent any seepage or leakage, due to continued pressure and the clearance between sleeve 10 and the wall of chamber 12. It will be understood, of course, that the washer may be mounted in body B and the seat therefor provided on regulator R, as in the case of the washer 36' mounted on the upper end of plug 13' of Fig. 8, the washer 36' being adapted to engage the seat formed by the underside of flange 38' of stem 11', and also that other types of closure valves may be provided. If desired, the fit between sleeve 10 and the wall of chamber 12 may be made sufficiently tight, so that the possibility of leakage during complete closure will be prevented, but the expense, incident to the accurate machining necessary, usually is greater than the cost of adding the closure valve at the upper end of the sleeve 10.

The valve body B is formed by casting or forging, being provided interiorly with threads 39 to receive plug 13, which is locked in a position in which ports 15 and 16 register with passages 17 and 18, respectively, by suitable means, such as a locking ring 40, as in Fig. 3. Utilization of plug 13 to provide intake chamber 12 therewithin, as well as to provide discharge chamber 26 within the valve body above the plug, are features of considerable value, since the plug 13, prior to installation, is more readily accessible than valve body B would be, for accurate machining of chamber 12 and ports 15 and 16. Chamber 12 may be accurately produced by drilling and/or reaming, while ports 15 and 16 are preferably milled. As will be evident, generally rectangular slots extending for about 90°, to provide ports 15 and 16, are quite readily milled in the side wall of plug 13. As will be evident, the expense of producing accurate ports 15 and 16 in the interior of the valve body B would greatly exceed the cost of milling the slots in plug 13.

Once the plug 13 is inserted in position, it is normally not withdrawn again unless for inspection of seat 35, or replacement of washer 36 or the like, and the threads 39, between the plug 13 and the valve body, are preferably relatively tight, and, in addition, a sealing compound which will not be affected by the fluid flowing through the valve is employed.

Stem 11 or regulator R passes upwardly from discharge chamber 26 through a suitable hole drilled in valve body B, while packing 41, compressed by a packing gland 42, is provided to prevent leakage around the stem 11. As will be evident, all of the control elements C are mounted exteriorly of the packing 41, so that only one packing gland is necessary.

The control elements C include a circular handle 45, keyed or otherwise secured to stem 11, for rotating the stem and thereby regulating the relative proportions of the fluids, and two handles or tabs 46, extending upwardly on opposite sides from an interiorly threaded sleeve 47, which engages threads 48 formed on the outside of valve body B and is adapted to be rotated to move the stem 11 and sleeve 10 upwardly and downwardly, to regulate the total volume of flow. Handles 46 preferably are disposed at two opposite positions, and outwardly from circular handle 45, to permit a maximum of accessibility to the latter. For moving stem 11 upwardly and downwardly, a lifting ring 49 is received around its outer edge between a shoulder formed at the upper end of lifting sleeve 47 and a restraining ring 51, which may be riveted or otherwise suitably attached to sleeve 47. The inner edge of lifting ring 49 is received between a pair of washers 52, which are placed between a shoulder 53 on stem 11 and circular handle 45. Lifting ring 49 is preferably non-rotatable, so that when handles 46 and lifting sleeve 47 are turned, the rotational movement thereof will not be imparted to the fluid proportion adjustment, and also so that when the circular handle 45 is turned to change the proportional adjustment, the rotational movement will not be transmitted to lifting sleeve 47, which would cause a change in the flow volume adjustment. For this purpose, a stop pin 54 extends through a hole 55 in lifting ring 49 and is threaded into a tapped hole 56 in valve body B. The head of pin 54 is additionally adapted to act as a stop to limit upward movement of regulator R and the sleeve 10, so that the sleeve cannot be moved upwardly past the full flow position. In addition, pin 54 may be utilized to limit the angular movement of handle 45, as shown in Fig. 9, by providing handle 45' with an internal web 57 extending radially, each edge of the web 57 forming an abutment or stop to limit the turning of handle 45'. The width of web 57, of course, determines the extent of angular movement permitted.

The stem 11, as in Fig. 7, is provided with a longitudinal hole 58, extending from the outer end nearly to the sleeve 10, and is adapted to act as a well to receive an extending leg of an indicating device 59, such as a thermometer of conventional construction, which is provided, as in Fig. 2, with an indicating pointer 60 and a dial 61, on which the temperature of the fluid mixture passing through sleeve 10 is indicated. The thermometer may be of the bi-metallic type, and include a housing adapted to be received in a well 62 formed in circular handle 45, Fig. 3. As will be evident, the thermometer may be of any other suitable type, and other instruments may be used, such as a pressure gage 64 of Fig. 9, for indicating the pressure within the sleeve 10, or in discharge chamber 26, as by well 58' of Fig. 10 being extended to the interior of sleeve 10, or as in Fig. 8, by a side passage 65 being drilled from well 58 to communicate with discharge chamber 26. The upper end of stem 11, as in Fig. 7, may be threaded to facilitate attachment of circular handle 45 and the thermometer housing thereto, while the well 58 may be eliminated entirely, if so desired.

What is claimed is:

1. In a mixture control valve, a body having a cylindrical intake chamber and ports in the wall thereof, and an inlet leading to each port for supplying fluids of different characteristics thereto; a sleeve disposed in said intake chamber and having a slot adapted to cooperate with said ports to control the flow of fluid therethrough; a handle for rotating said sleeve; a rotatable, screw-operated lifting handle for moving said sleeve axially; means connecting said rotatable lifting handle with said sleeve, including an annular ring; and a pin extending through said ring to prevent rotative movement of said lifting handle from being imparted to said sleeve.

2. In a mixture control valve, as defined in claim 1, wherein said pin is provided with a head adapted to act as a stop to limit axial movement of said stem.

3. A mixture control valve comprising a body having inlet nipples extending therefrom in opposite directions adjacent one end and a discharge nipple spaced from said inlet nipples, said body having a generally cylindrical opening at said end; a hollow cylindrical plug threadedly received in said opening and having milled slots in the side wall thereof to provide a cylindrical intake chamber having oppositely disposed generally rectangular ports, each said inlet nipple having a passage leading to a port, for supplying fluids of different characteristics thereto, said plug also providing an outlet chamber in said body disposed axially of said intake chamber with said outlet nipple having a passage connecting therewith; a regulator having a cylindrical hollow sleeve disposed in said intake chamber, a stem for said sleeve extending through said discharge chamber, and a flange at the stem end of said sleeve, said regulator having a groove at said flange to receive seating material adapted to close against the end of said plug to provide a closure valve between said chambers, said sleeve also having a generally rectangular slot extending peripherally for about 180° and adapted to cooperate with said ports to control the flow of fluid therethrough; a single packing for said stem exteriorly of said discharge chamber; a circular handle for rotating said stem and attached thereto at the outer end, said handle having a well and said stem having a longitudinal hole extending to about said flange, for receiving a temperature indicating device; an outer sleeve having outwardly disposed handles at each side of said cylindrical handle, said outer sleeve and said body having cooperating threads for effecting movement of said outer sleeve longitudinally of said body; an annular lifting ring having a hole and rotatably attached at its outer edge to said outer sleeve and at its inner edge to said stem; and a pin extending through said hole for preventing rotation of said lifting ring, said pin being mounted on said body and having a head adapted to limit outward movement of said lifting ring and stem.

References Cited in the file of this patent

UNITED STATES PATENTS

| Number | Name | Date |
|---|---|---|
| 685,510 | Flint | Oct. 29, 1901 |
| 841,817 | Ricketts | Jan. 22, 1907 |
| 899,201 | Braybrook | Sept. 22, 1908 |
| 1,014,501 | McCloud | Jan. 9, 1912 |
| 1,517,990 | Hinkle | Dec. 2, 1924 |
| 1,532,745 | Hickerson | Apr. 7, 1925 |
| 1,693,758 | Hennessey | Dec. 4, 1928 |
| 1,808,092 | Wimmer | June 2, 1931 |
| 1,882,953 | Saelzler | Oct. 18, 1932 |
| 1,943,865 | Hennessey | Jan. 16, 1934 |
| 1,949,300 | Fitter | Feb. 27, 1934 |
| 1,978,992 | Donnelly | Oct. 30, 1934 |
| 2,087,223 | Thompson | July 13, 1937 |
| 2,373,702 | Moen | Apr. 17, 1945 |